(12) United States Patent
Furukawa et al.

(10) Patent No.: US 9,845,888 B2
(45) Date of Patent: Dec. 19, 2017

(54) MECHANICAL SEAL

(71) Applicants: EAGLE INDUSTRY CO., LTD., Minato-ku, Tokyo (JP); EAGLEBURGMANN JAPAN CO., LTD., Minato-ku, Tokyo (JE)

(72) Inventors: Yasunari Furukawa, Tokyo (JP); Masakazu Kito, Tokyo (JP)

(73) Assignees: EAGLE INDUSTRY CO., LTD. (JP); EAGLEBURGMANN JAPAN CO., LTD. (JP)

( * ) Notice: Subject to any disclaimer, the term of this patent is extended or adjusted under 35 U.S.C. 154(b) by 0 days.

(21) Appl. No.: 14/407,443

(22) PCT Filed: Aug. 26, 2013

(86) PCT No.: PCT/JP2013/072654
§ 371 (c)(1),
(2) Date: Dec. 11, 2014

(87) PCT Pub. No.: WO2014/034582
PCT Pub. Date: Mar. 6, 2014

(65) Prior Publication Data
US 2015/0184754 A1 Jul. 2, 2015

(30) Foreign Application Priority Data
Aug. 29, 2012 (JP) .................. 2012-189294

(51) Int. Cl.
*F16J 15/34* (2006.01)
*F16J 15/36* (2006.01)

(52) U.S. Cl.
CPC ....... *F16J 15/3464* (2013.01); *F16J 15/3488* (2013.01); *F16J 15/36* (2013.01); *F16J 15/363* (2013.01)

(58) Field of Classification Search
CPC ...... F16J 15/3464; F16J 15/3488; F16J 15/36; F16J 15/363
(Continued)

(56) References Cited

U.S. PATENT DOCUMENTS 2,269,821 A * 1/1942 Kemphert ............... F16D 1/096
  301/5.1
2,402,743 A * 6/1946 Firth ....................... F16D 1/096
  29/892

(Continued)

FOREIGN PATENT DOCUMENTS

CN 201794774 U 4/2011
CN 102378872 A 3/2012
(Continued)

OTHER PUBLICATIONS

International Search Report (ISR), dated Oct. 1, 2013, issued for International application No. PCT/JP2013/072654.
(Continued)

*Primary Examiner* — Nathan Cumar
(74) *Attorney, Agent, or Firm* — Hayes Soloway P.C.

(57) ABSTRACT

A mechanical seal has a seal ring and a mating ring that faces and slides against the seal ring and either the seal ring or mating ring is supported via a bellows on the equipment interior side of a seal cover installed on a housing, while the other rotates together with a rotational shaft; and a baffle sleeve with a roughly L-shaped cross-section is fixed on the equipment exterior side of the seal cover to guide quenching liquid to the sliding surfaces of the seal ring and mating ring, where the baffle sleeve is structurally split into a flange part and cylinder part. The mechanical seal allows for preassembly of its seal members on the stationary side, baffle sleeve, damper, and other related parts at a factory, service center,
(Continued)

etc., in a reliable and controlled manner, requiring fewer assembly steps during onsite engineering works.

13 Claims, 10 Drawing Sheets

(58) Field of Classification Search
USPC .......................................................... 277/352
See application file for complete search history.

(56) References Cited

U.S. PATENT DOCUMENTS

| | | | |
|---|---|---|---|
| 4,335,888 A | | 6/1982 | Ohba et al. |
| 5,114,160 A | * | 5/1992 | Ootsuka ............... F16J 15/3404 |
| | | | 277/408 |
| 6,019,557 A | * | 2/2000 | Lo ........................... F16B 37/00 |
| | | | 411/176 |
| 2012/0013076 A1 | | 1/2012 | Takahashi |

FOREIGN PATENT DOCUMENTS

| | | | | |
|---|---|---|---|---|
| JP | 1991-088063 U | | 9/1991 | |
| JP | 1994-008868 U | | 2/1994 | |
| JP | WO 2010 1139392 | * | 10/2010 | |
| JP | WO 2010113932 | * | 10/2010 | ............ F16J 15/363 |
| WO | 2010/113932 A1 | | 10/2010 | |
| WO | 2010 1139392 | * | 10/2010 | |

OTHER PUBLICATIONS

Notification of Transmittal of Translation of the International Preliminary Report on Patentability (PCT/IB/338) dated Mar. 12, 2015, with International Preliminary Report on Patentability (PCT/IB/373) and Written Opinion of the International Searching Authority (PCT/ISA/237), for corresponding international application PCT/JP2013/072654.

First Notification of Reason for Refusal with Search Report issued by the State Intellectual Property Office of China on Oct. 10, 2015 for Chinese counterpart application No. 201380030168.0.

A Second Office Action with Search Report issued by the State Intellectual Property Office of China on Jun. 23, 2016 or Chinese counterpart application No. 201380030168.0.

Fourth Official Action issued in Chinese Patent Application Serial No. 201380030168.0, dated Jun. 23, 2017, with translation (15 pgs).

* cited by examiner

[FIG. 1]

Background Art

MECHANICAL SEAL

This application is the U.S. National Phase under 35 U.S.C. §371 of International Application PCT/JP2013/072654, filed Aug. 26, 2013, which claims priority to Japanese Patent Application No. 2012-189294, filed Aug. 29, 2012. The International Application was published under PCT Article 21(2) in a language other than English.

TECHNICAL FIELD

The present invention relates to a mechanical seal for sealing equipment used in oil refinery, petrochemical, steel-chemical and other applications, which handles high-temperature liquids of over 200° C., and specifically to a mechanical seal of high-temperature bellows seal type having a bellows and baffle sleeve.

BACKGROUND ART

One of the traditionally known mechanical seals used in applications where the temperature of sealed liquid exceeds 200° C. and flushing with coolant is not performed, is a mechanical seal of high-temperature bellows seal type like the one shown in FIG. 10 (hereinafter referred to as "prior art; refer to Patent Literature 1, for example).

Figure 10:
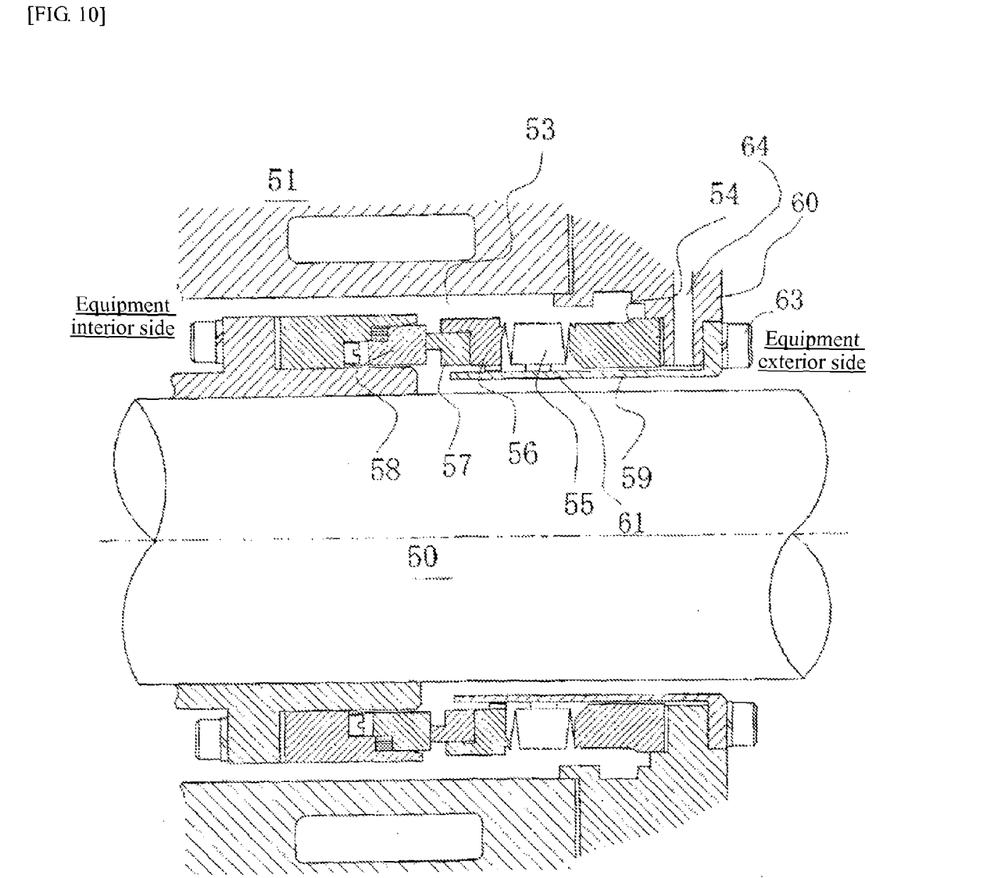
FIG. 10 Longitudinal section view showing a conventional mechanical seal of high-temperature bellows seal type.

The mechanical seal of high-temperature bellows seal type according to the prior art as shown in FIG. 10 is a mechanical seal installed on a shaft seal part 53 formed between a rotational shaft 50 and housing 51 to seal a space between the rotational shaft 50 and housing 51; wherein such mechanical seal has: a collar 54 installed on the housing 51 side; a bellows 55 connected to the collar 54; a retainer 56 connected to the bellows 55; a seal ring 57 engaged with the retainer 56; a mating ring 58 installed on the rotational shaft 50 side; and a cylindrical baffle sleeve 59 provided at a specific interval on the inner periphery side of the collar 54. In addition, steam quench is supplied from a supply hole 64 provided in a seal cover 60, which then flows through the space formed between the inner periphery of the stationary side of the mechanical seal and the outer periphery of the baffle sleeve 59 and reaches the end face of the seal to cool the mechanical seal part, and which also cleans and discharges the liquid seeping from the end face of the seal.

Then, the sliding torque on the end face of the seal ring 57 is transmitted to the retainer 56, bellows 55, and collar 54, in this order, being received by the collar 54 fixed on the seal cover 60 with bolts 63. Minute vibration (stick-slip) occurring in the circumferential direction as a result of change in the lubrication condition of the end face of the seal ring 57 propagates to the retainer 56 and to the bellows 55. To suppress such minute vibration in the circumferential direction, the baffle sleeve 59 fixed on the seal cover 60 with bolts 63 extends to the inner periphery part of the retainer 56 to limit the outer diameter of the baffle sleeve 59 and innermost diameter of the retainer to a minimum gap at some parts (four equidistance points in many cases) along the circumference, while a damper 61 that contacts the inner periphery surface of the bellows 55 to exert vibration-damping effect is installed on the outer periphery surface of the baffle sleeve 59 so that when vibration occurs, the damping effect will prevent the amplitude of vibration from exceeding the minimum gap.

With this type of mechanical seal, normally the collar 54, bellows 55, and retainer 56 are joined by means of welding, for example, while the seal ring 57 made of carbon or other sliding material is hermetically shrink-fitted or press-fitted in the retainer 56, and these members are preassembled as one piece at the factory, etc.

However, this mechanical seal according to the prior art has problems as described below.

When various members are installed on the seal cover 60, the collar 54, bellows 55, retainer 56, and seal ring 57 (hereinafter referred to as "seal members on the stationary side") are installed on the equipment interior side (sealed liquid side) of the seal cover 60, while the baffle sleeve 59 which is designed as one piece having an L-shaped cross-section can be installed only from the equipment exterior side (atmosphere side) of the seal cover 60. As a result, the seal members on the stationary side, etc., cannot be preassembled with the baffle sleeve 59 and must therefore be assembled onsite. In addition, this onsite assembly requires a difficult process of wrapping around the baffle sleeve 59 the damper 61 installed between the inner periphery surface of the bellows 55 and outer periphery surface of the baffle sleeve 59, and then inserting the bellows 55.

PRIOR ART LITERATURES

Patent Literatures

Patent Literature 1: International Patent Laid-open No. 2010/113932

SUMMARY OF INVENTION

Problems to be Solved by Invention

The object of the present invention is to provide a mechanical seal that allows for preassembly of its seal members on the stationary side, baffle sleeve, damper, and other related parts at the factory, service center, etc., in a reliable and controlled manner, thereby requiring fewer assembly steps during onsite engineering works.

Means to Solve Problems

To achieve the aforementioned object, firstly the mechanical seal proposed by the present invention is a mechanical seal installed on a shaft seal part formed between a housing and rotational shaft to seal a space between the housing and rotational shaft, wherein such mechanical seal is characterized in that: the mechanical seal has a seal ring and a mating ring that faces and slides against the seal ring and either the seal ring or mating ring is supported via bellows on the equipment interior side of a seal cover installed on the housing, while the other rotates together with the rotational shaft; and a baffle sleeve with a roughly L-shaped cross-section is fixed on the equipment exterior side of the seal cover to guide quenching liquid to the sliding surfaces of the seal ring and mating ring, where the baffle sleeve is structurally split into a flange part and cylinder part.

According to these characteristics, the collar, bellows, retainer, seal ring, baffle sleeve cylinder part, damper, and other related parts can be preassembled in a reliable and controlled manner at the factory or service center, thereby requiring fewer member assembly steps during onsite engineering works. This not only improves the ease of assembly, but also reduces human errors during onsite engineering works. In addition, while traditionally carving a one-piece baffle sleeve with roughly an L-shaped cross-section from a round bar requires a material of "outer diameter of the flange part×length of the cylinder part" in size, and machining the round bar to change its cross-section to roughly an L-shape is a very wasteful exercise because the majority of the round bar must be shaved off, the baffle sleeve under the present invention is formed of separate materials constituting its flange part and cylinder part, respectively, and therefore the waste associated with the prior art can be eliminated. Furthermore, the mechanical seal proposed by the present invention requires a significantly smaller installation space on the equipment exterior side of the seal cover compared to the prior art, thereby saving assembly space.

In addition, secondly, the mechanical seal proposed by the present invention is characterized, in addition to the first characteristics, in that: the flange part has a slit formed in one location in the circumferential direction and the inner periphery surface of the flange part is engaged with the outer periphery surface of the cylinder part, while the outer periphery surface of the flange part is engaged with a tapered surface for flange engagement provided on the equipment exterior side of the seal cover; and because the outer periphery surface of the flange part is fit along the tapered surface, the inner periphery surface of the flange part clamps the outer periphery surface of the cylinder part.

According to these characteristics, fitting the flange part at the specified position exerts clamping force in the diametral direction so as to keep the flange part and cylinder part connected just like a one-piece baffle sleeve. As a result, a baffle sleeve sufficiently capable of withstanding vibration and other external disturbances can be obtained.

In addition, thirdly, the mechanical seal proposed by the present invention is characterized, in addition to the first or second characteristics, in that: the flange part has multiple bolt holes in the circumferential direction and is fixed on the equipment exterior side of the seal cover via a bolt.

According to these characteristics, the flange part can be fitted at the specified position by means of the bolt, while clamping force is exerted in the diametral direction to keep the flange part and cylinder part connected just like a one-piece baffle sleeve.

In addition, fourthly, the mechanical seal proposed by the present invention is characterized, in addition to any of the first through third characteristics, in that: the flange part has a part having a small cross-section area formed at a position on the opposite side of the slit in the circumferential direction.

According to these characteristics, elastic deformation can be achieved easily as the flange part shrinks along its diameter.

In addition, fifthly, the mechanical seal proposed by the present invention is characterized, in addition to any of the first through fourth characteristics, in that: a ring-shaped convex part is provided on the outer periphery surface of the cylinder part of the baffle sleeve, in close proximity to the inner periphery surface of the cylindrical collar connected to one end of the bellows.

According to these characteristics, vibration of the baffle sleeve can be damped quite effectively when the baffle sleeve is fixed on the seal cover, because the inner periphery surface of the collar is in close proximity to the outer periphery surface of the ring-shaped convex part.

In addition, sixthly, the mechanical seal proposed by the present invention is characterized, in addition to any of the first through fifth characteristics, in that: a fixing means for fixing the baffle sleeve and collar is provided on the cylinder part of the baffle sleeve.

According to these characteristics, the baffle sleeve and collar can be fixed together by screwing in setscrews to prevent rattling of members during transport after preassembling the collar, baffle sleeve, etc., and during operation.

In addition, seventhly, the mechanical seal proposed by the present invention is characterized, in addition to any of the first through fifth characteristics, in that: a ring-shaped convex part with a tapered part on its outer periphery surface is provided on the outer periphery surface of the cylinder part of the baffle sleeve, in close proximity to the inner periphery surface of the cylindrical collar connected to one end of the bellows, while another tapered part is provided on the inner periphery surface of the collar in a manner facing the aforementioned tapered part; and these tapered parts are provided in such a way that they can contact each other by moving relative to each other in the axial direction, but do not interfere with each other during assembly.

According to these characteristics, the bolt for fixing the flange part on the equipment exterior side of the seal cover can be used to fix the tapered part of the ring-shaped convex part of the baffle sleeve with the tapered part of the collar in a manner contacting each other to prevent rattling of members without having to prepare any special fixing member during transport after preassembling the collar, baffle sleeve, etc.

Effects of Invention

The present invention provides excellent effects as described below:

(1) A baffle sleeve of roughly L-shaped cross-section is fixed on the equipment exterior side of the seal cover and extends on the inner periphery side of the seal ring, bellows, etc., where the baffle sleeve splits into a flange part and cylinder part, and accordingly the collar, bellows, retainer, seal ring, baffle sleeve cylinder part, damper, and other related parts can be preassembled in a reliable and controlled manner at the factory or service center, thereby requiring fewer member assembly steps during onsite engineering works. This not only improves the ease of assembly, but also reduces human errors during onsite engineering works. In addition, while traditionally carving a one-piece baffle sleeve with roughly an L-shaped cross-section from a round bar requires a material of "outer diameter of the flange part×length of the cylinder part" in size, and machining the round bar to change its cross-section to roughly an L-shape is a very wasteful exercise because the majority of the round bar must be shaved off, the baffle sleeve under the present invention is formed of separate materials constituting its flange part and cylinder part, respectively, and therefore the waste associated with the prior art can be eliminated. Furthermore, the mechanical seal proposed by the present invention requires a significantly smaller installation space on the equipment exterior side of the seal cover compared to the prior art, thereby saving assembly space.

(2) The flange part has a slit formed in one location in the circumferential direction and the inner periphery surface of the flange part is engaged with the outer periphery surface of the cylinder part, while the outer periphery surface of the flange part is engaged with the tapered surface for flange engagement provided on the equipment exterior side of the seal cover and, because the outer periphery surface of the flange part is fit along the tapered surface, the inner periphery surface of the flange part clamps the outer periphery surface of the cylinder part, and therefore fitting the flange part at the specified position exerts clamping force in the diametral direction so as to keep the flange part and cylinder part connected just like a one-piece baffle sleeve. As a result, a baffle sleeve sufficiently capable of withstanding vibration and other external disturbances can be obtained.

(3) The flange part has multiple bolt holes in the circumferential direction and is fixed on the equipment exterior side of the seal cover via a bolt, and accordingly the flange part can be fitted at the specified position by means of the bolt, while clamping force is exerted in the diametral direction to keep the flange part and cylinder part connected just like a one-piece baffle sleeve.

(4) The flange part has a part having a small cross-section area formed at a position on the opposite side of the slit in the circumferential direction, and accordingly elastic deformation can be achieved easily as the flange part shrinks along its diameter.

(5) A ring-shaped convex part is provided on the outer periphery surface of the cylinder part of the baffle sleeve, in close proximity to the inner periphery surface of the cylindrical collar connected to one end of the bellows, and accordingly vibration of the baffle sleeve can be damped quite effectively when the baffle sleeve is fixed on the seal cover, because the inner periphery surface of the collar is in close proximity to the outer periphery surface of the ring-shaped convex part.

(6) A fixing means for fixing the baffle sleeve and collar is provided on the cylinder part of the baffle sleeve, and accordingly the baffle sleeve and collar can be fixed together by screwing in setscrews to prevent rattling of members during transport after preassembling the collar, baffle sleeve, etc., and during operation.

(7) A ring-shaped convex part with a tapered part on its outer periphery surface is provided on the outer periphery surface of the cylinder part of the baffle sleeve, in close proximity to the inner periphery surface of the cylindrical collar connected to one end of the bellows, while another tapered part is provided on the inner periphery surface of the collar in a manner facing the aforementioned tapered part, and these tapered parts are provided in such a way that they can contact each other by moving relative to each other in the axial direction, but do not interfere with each other during assembly, and accordingly the bolt for fixing the flange part on the equipment exterior side of the seal cover can be used to fix the tapered part of the ring-shaped convex part of the baffle sleeve with the tapered part of the collar in a manner contacting each other to prevent rattling of members without having to prepare any special fixing member during transport after preassembling the collar, baffle sleeve, etc.

BRIEF DESCRIPTION OF DRAWINGS

FIG. 3 (a) a longitudinal section view of the baffle sleeve in FIGS. 1 and 2, and (b) a front view of the flange part of the baffle sleeve in FIG. (a).

MODES FOR CARRYING OUT THE INVENTION

Modes for carrying out a mechanical seal conforming to the present invention are explained in detail by referring to the drawings, but it should be noted that interpretations of the present invention are not limited to the following and various changes, modifications and improvements can be added according to the knowledge of those skilled in the art so long as they do not deviate from the scope of the present invention.

Embodiment 1

Figure 1:
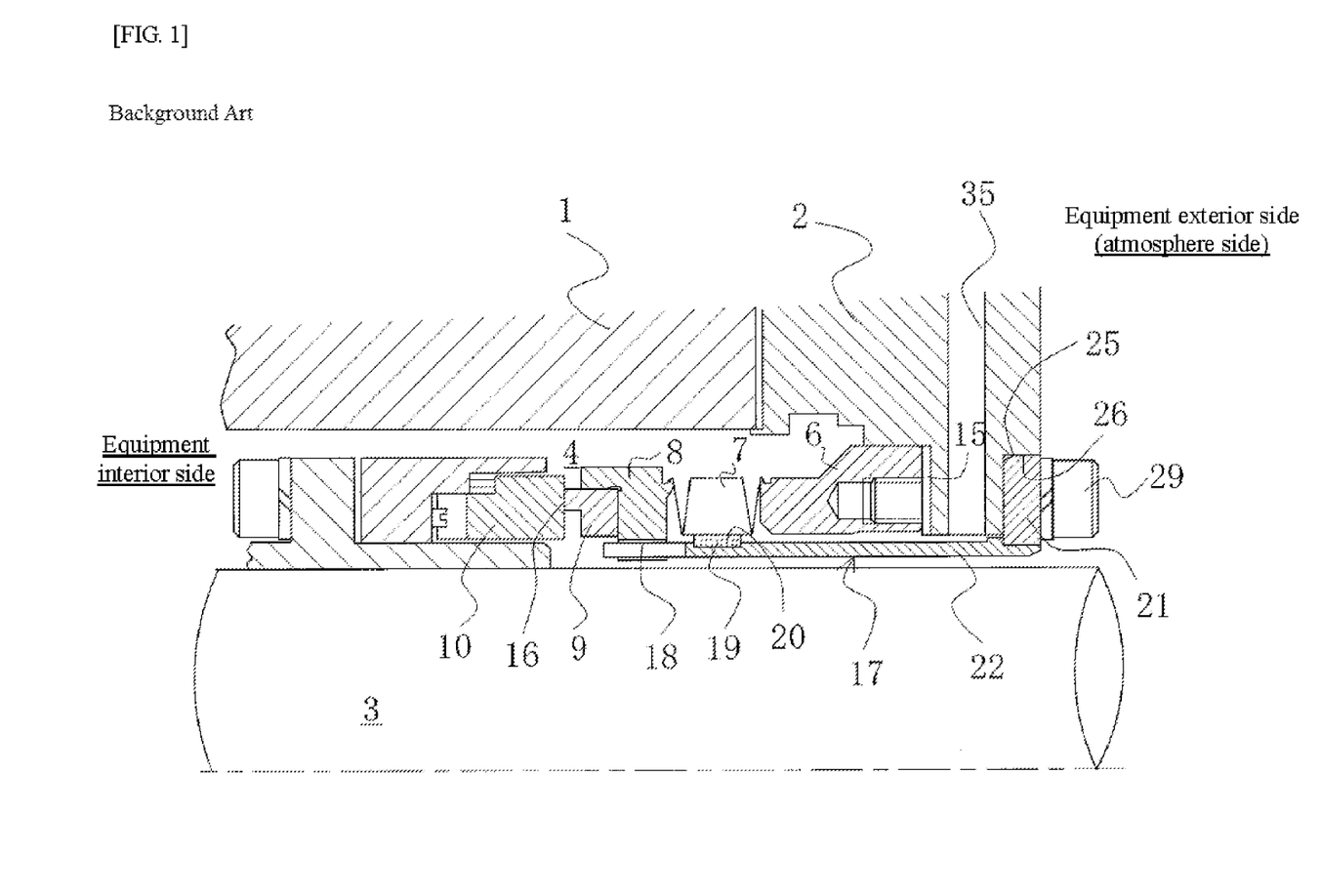
FIG. 1 Longitudinal section view showing an example of a mechanical seal conforming to Embodiment 1 of the present invention.
Figure 2:
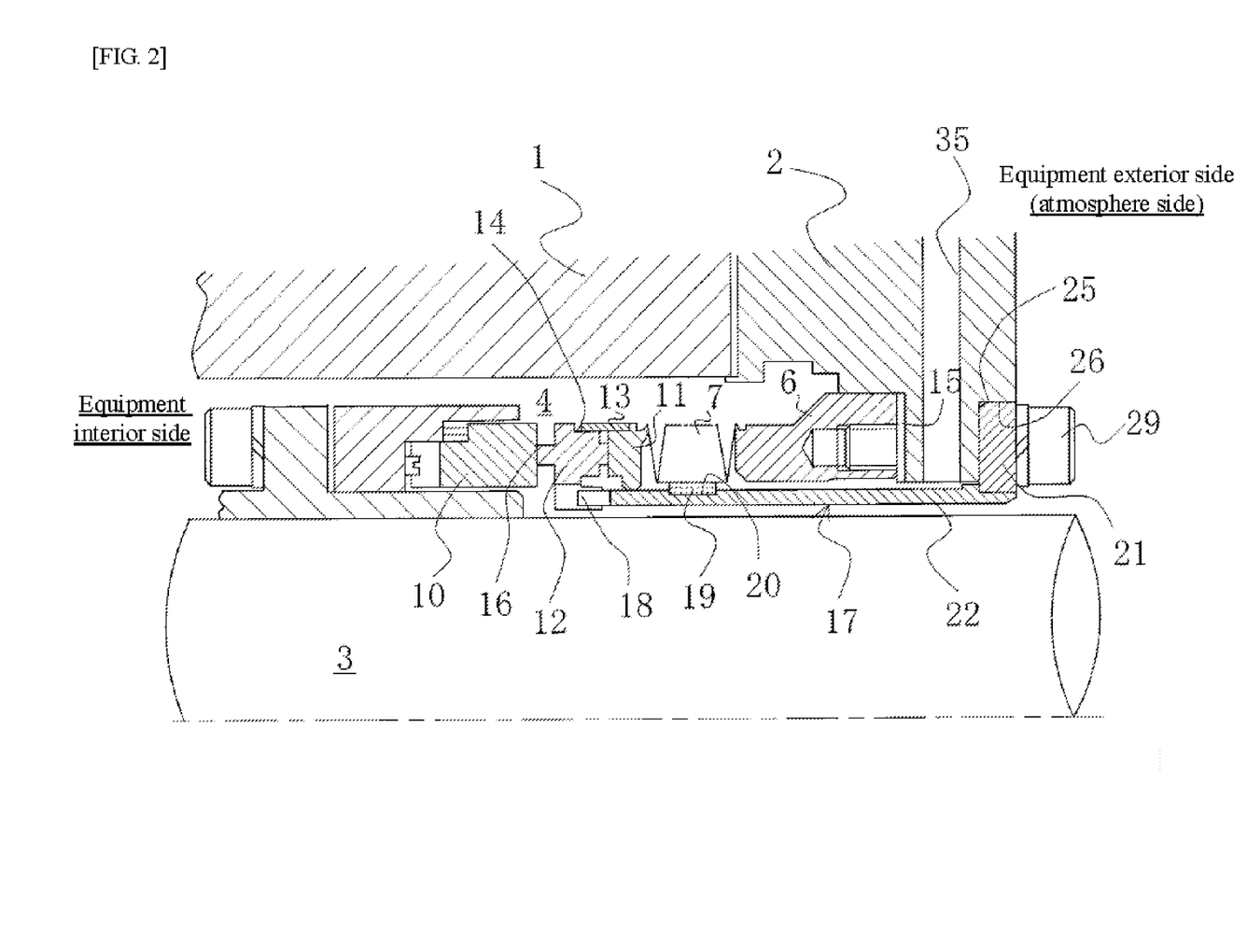
FIG. 2 Longitudinal section view showing another example of a mechanical seal conforming to Embodiment 1 of the present invention.

The mechanical seal conforming to Embodiment 1 of the present invention is explained by referring to FIGS. 1 and 2.

FIG. 1 is a longitudinal section view showing an example of a mechanical seal conforming to Embodiment 1 of the present invention, where, in FIG. 1, reference symbol 1 represents a housing of a shaft seal part in a pump or other equipment handling high-temperature liquid exceeding 200° C. in an oil refinery, petrochemical, steel, chemical, or other application, such as equipment handling hot oil in a vacuum distillation facility in an oil refinery plant, while reference symbol 2 represents a seal cover installed on the housing 1 by bolts or other fixing means (not illustrated). Note that the left side of the FIG. 1 corresponds the equipment interior side, while the right side of the FIG. 1 corresponds to the equipment exterior side (atmosphere side)

The mechanical seal shown in FIG. 1 is a mechanical seal installed on a shaft seal part 4 formed between a rotational shaft 3 and housing 1 to seal a space between the rotational shaft 3 and housing 1, wherein such mechanical seal has: a collar 6 installed on the equipment interior side of a seal cover 2; a bellows 7 connected to the collar 6; a retainer 8 connected to the bellows 7; a seal ring 9 shrink-fitted or press-fitted on the end face of the retainer 8; and a mating ring 10 installed on the rotational shaft 3 side.

The collar 6 is formed of metal and has a cylinder shape, and is installed on the equipment interior side of the seal cover 2 via a ring-shaped gasket 15.

The bellows 7 is constituted by multiple metal diaphragm sheets that have been formed as wavy rings via stamping, etc., which are then arranged in line and the outer diameters and inner diameters of adjacent diaphragm sheets are alternately connected by means of gas welding, etc., to form an accordion-like cylinder shape as a whole, one end of which is integrally connected to the collar 6 side by means of gas welding, etc.

The retainer 8 is formed of metal and has a cylinder shape, and is integrally connected to the other end of the bellows 7 by means of gas welding, etc. The retainer 8 is made of the same material used for the bellows 7 or other material having roughly the same coefficient of thermal expansion.

Normally the retainer 8, bellows 7, and collar 6 are welded into one piece and then its entire surface is ion-plated uniformly to a thickness of no more than 10 µm using special chromium nitride, titanium nitride, or other corrosion-resistant, wear-proof material. This uniform corrosion resistance over the entire surface of the retainer 8, bellows 7, and collar 8 means that the corrosion resistance of ion-plating becomes the corrosion resistance of the entire structure, even when the material of any constituent part has lower corrosion resistance, which significantly reduces the limitations on material selection.

The seal ring 9 is formed of silicon carbide, carbon, other ceramics, etc., and has a cylinder shape, forming a seal surface 16 vertical to the axial line of the rotational shaft 3 on the sliding surface with the mating ring 10.

The seal ring 9 is shrink-fitted or press-fitted on the end face of the retainer 8, and the width of the seal end face on the side of the seal ring 9 opposite the mating ring is roughly the same as or slightly smaller than the width of the seal end face that slides against the mating ring 10.

A cylindrical baffle sleeve 17 is installed at a specific interval on the inner periphery side of the seal ring 9, retainer 8, bellows 7, and collar 6, and this baffle sleeve 17 ensures quenching liquid supplied from a quenching liquid supply hole 35 provided in the seal cover 2 is guided to the seal surface 16. The baffle sleeve 17 is made of stainless steel or other hard material or ion-plated to a thickness of no more than 10 µm using hard chromium plating, special chromium nitride, titanium nitride, or other corrosion-resistant, wear-proof material.

One or more cutouts (not illustrated) are provided on the inner periphery side of the retainer 8.

On the other hand, the tip of the baffle sleeve 17 fixed on the seal cover 2 extends to near the seal end face of the seal ring 9 to form male teeth (not illustrated) that engage with the cutout (s) in the retainer 8 with a very small gap left in between, so as to form a clutch structure 18 constituted by the cutout(s) in the retainer 8 meshing with the teeth of the baffle sleeve 17 in a manner movable in the axial direction. Because of this structure, the sliding torque on the seal end face of the seal ring 9 is received by the baffle sleeve 17 and not transmitted to the bellows 7, and consequently the bellows 7 will not be affected by any stick-slip occurring on the seal end face of the seal ring 9 as a result of unstable lubrication of the seal surface.

A damper 19 is provided between the outer periphery surface of the baffle sleeve 17 and inner periphery surface of the bellows 7 to damp the vibration of the bellows 7 should the bellows 7 vibrate. The damper 19 has a band shape, for example, and is installed in a ring-shaped groove 20 formed on the outer periphery surface of the baffle sleeve 17. This way, fatigue of the bellows can be postponed to ensure durability. Additionally, one or more cutouts are provided in the outer periphery part of the damper 19 and inner periphery part of the retainer 8 to guide the quenching liquid supplied from the quenching liquid supply hole 35 to the seal surface 16 by means of the baffle sleeve 17, so that a very small amount of liquid leaking from the seal surface 16 can be cleaned and discharged.

FIG. 2 is a longitudinal section view showing another example of a mechanical seal conforming to Embodiment 1 of the present invention, which is different from the mechanical seal shown in FIG. 1 in that the end face of the retainer 8 hermetically contacts the end face of the seal ring 9 via a lap joint in between, but since the rest of the constitution is the same as in FIG. 1, redundant explanations are omitted.

The mechanical seal shown in FIG. 2 is a mechanical seal installed on the shaft seal part 4 formed between the rotational shaft 3 and housing 1 to seal a space between the rotational shaft 3 and housing 1, wherein such mechanical seal has: the collar 6 installed on the equipment interior side of the seal cover 2; the bellows 7 connected to the collar 6; a retainer 11 connected to the bellows 7; a seal ring 12 hermetically contacting the end face of the retainer 11 with a lap joint in between; and the mating ring 10 installed on the rotational shaft 3 side.

The seal ring 12 has a lapped seal end face on both ends and the seal ring 12 is structurally separate from the retainer 11, while the end face on the seal ring 12 side of the retainer 11 also has a lapped seal end face, and both are sealed using a lap joint structure where lapped surfaces are hermetically sealed together. Since the seal ring 12 is structurally separate from the retainer 11, the flatness of the seal end face of the seal ring 12 that slides against the mating ring 10 is not affected by any difference in thermal expansion even in a high-temperature ambience, and hermetic property is retained as a result. Any pressure deformation or thermal deformation of the retainer 11 itself has no bearing, either. Furthermore, there is no need for shrink fitting or press fitting, subsequent heat treatment, or any other special step, which means jigs for these steps are not required, either, leading to cost reduction and fewer man-hours. Moreover, the seal ring 12 can be replaced with ease.

The seal-side end face of the retainer 11 is hermetically contacting the seal end face of the seal ring 12 by means of the spring load of the bellows 7 and push force of fluid pressure, but since the seal ring 12 does not rotate, the seal end face of the retainer 11 is a virtually stationary sealing surface that does not slide by rotation.

A cutout is provided on the inner periphery side of the seal ring 12 and the clutch structure 18 constituted by the cutout meshing with the teeth of the baffle sleeve 17 in a manner movable in the axial direction is formed.

In addition, a ring-shaped concave part 14 is formed to partially shrink the outer diameter on the outer periphery surface of the retainer 11 and seal ring 12, and an alignment case 13 for aligning the retainer 11 and seal ring 12 is installed in this concave part 14.

The mechanical seal shown in FIG. 2 is structured in such a way that its seal ring 12 and retainer 11 are separate, where the seal ring 12 and retainer 11 are sealed together via a lap joint structure, while the seal ring 12 and baffle sleeve 17 adopt a clutch structure to mesh with each other in a manner movable in the axial direction, and accordingly the sliding torque on the seal end face of the seal ring 12 is received by the baffle sleeve 17 and not transmitted to the bellows 7, and consequently the bellows 7 will not be affected by any stick-slip occurring on the seal end face of the seal ring 12 as a result of unstable lubrication of the seal surface, due to free sliding at the lap joint.

Figure 3:
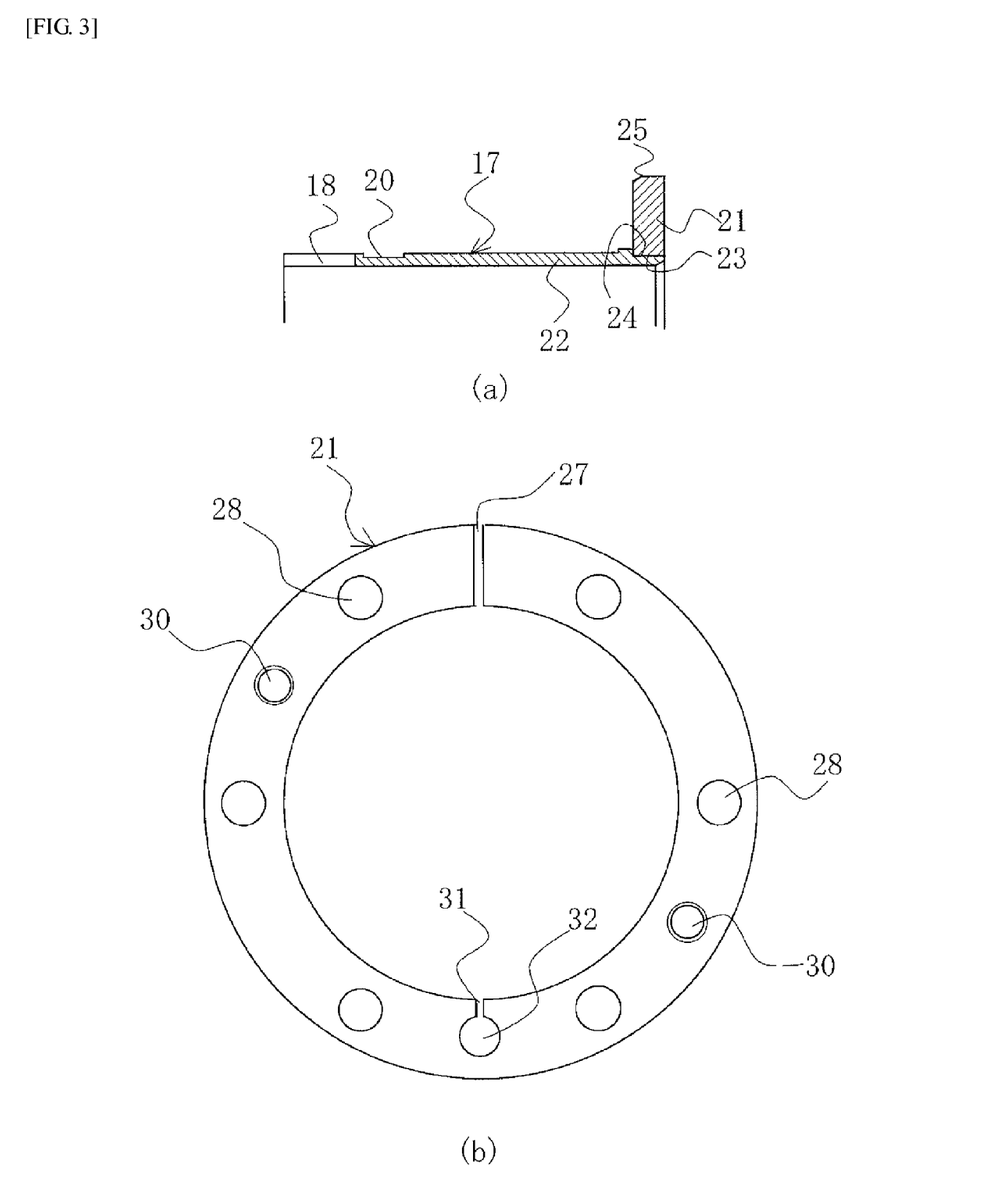

As shown in FIG. 3, the baffle sleeve 17 used by the mechanical seals in FIGS. 1 and 2 comprises a flange part 21 and cylinder part 22, has a roughly L-shaped cross-section, and the flange part 21 and cylinder part 22 are separate. To be specific, the flange part 21 and cylinder part 22 are made of different members, respectively, and formed in such a way that an inner periphery surface 23 of the flange part 21 engages with an outer periphery surface 24 of the base end of the cylinder part 22. Also, as shown in FIGS. 1 and 2, an outer periphery surface 25 of the flange part 21 is constituted so that it engages with a tapered surface for flange engagement 26 provided on the equipment exterior side of the seal cover 2. Formed at the tip of the cylinder part 22 is the clutch structure 18 that meshes with a cutout in the retainer 8 in a manner movable in the axial direction (or clutch structure 18 that meshes with a cutout in the seal ring 12 in a manner movable in the axial direction in the case of the mechanical seal in FIG. 2), while the ring-shaped groove 20 is formed on the outer periphery surface of the cylinder part 22 for placing the damper 19 for damping the vibration of the bellows 7 along the inner periphery surface of the bellows 7.

As shown in FIG. 3 (b), the flange part 21 has a slit 27 formed in one location in the circumferential direction so that, when the flange part 21 engages with the tapered surface for flange engagement 26, it is pressed from the outer side toward the center and the diameter of the flange part 21 shrinks as a result. In addition, the flange part 21 has multiple bolt holes 28 drilled and arranged in the circumferential direction so that it can be fixed onto the equipment exterior side of the seal cover 2 via a bolt 29. Furthermore, the flange part 21 has multiple separation tapped holes 30 drilled and arranged in the circumferential direction for easy separation of the flange part 21 from the seal cover 2.

Moreover, the flange part 21 has a part having a small cross-section area, such as a cutout 31 or through hole 32, formed at a position on the opposite side of the slit 27 in the circumferential direction, to facilitate elastic deformation when the flange part 21 shrinks along its diameter.

When the outer periphery surface 25 of the flange part 21 engages with the tapered surface for flange engagement 26 provided on the equipment exterior side of the seal cover 2 while the inner periphery surface 23 of the flange part 21 is engaged with the outer periphery surface 24 of the cylinder part 22, and the bolt 29 is then tightened, the flange part 21 shrinks along its diameter to create a condition where its inner periphery surface 23 is clamping the outer periphery surface 24 of the cylinder part 22, or a condition of interference fit. As a result, the flange part 21 and cylinder part 22 are integrally fixed on the seal cover 2.

Embodiment 2

Figure 4:
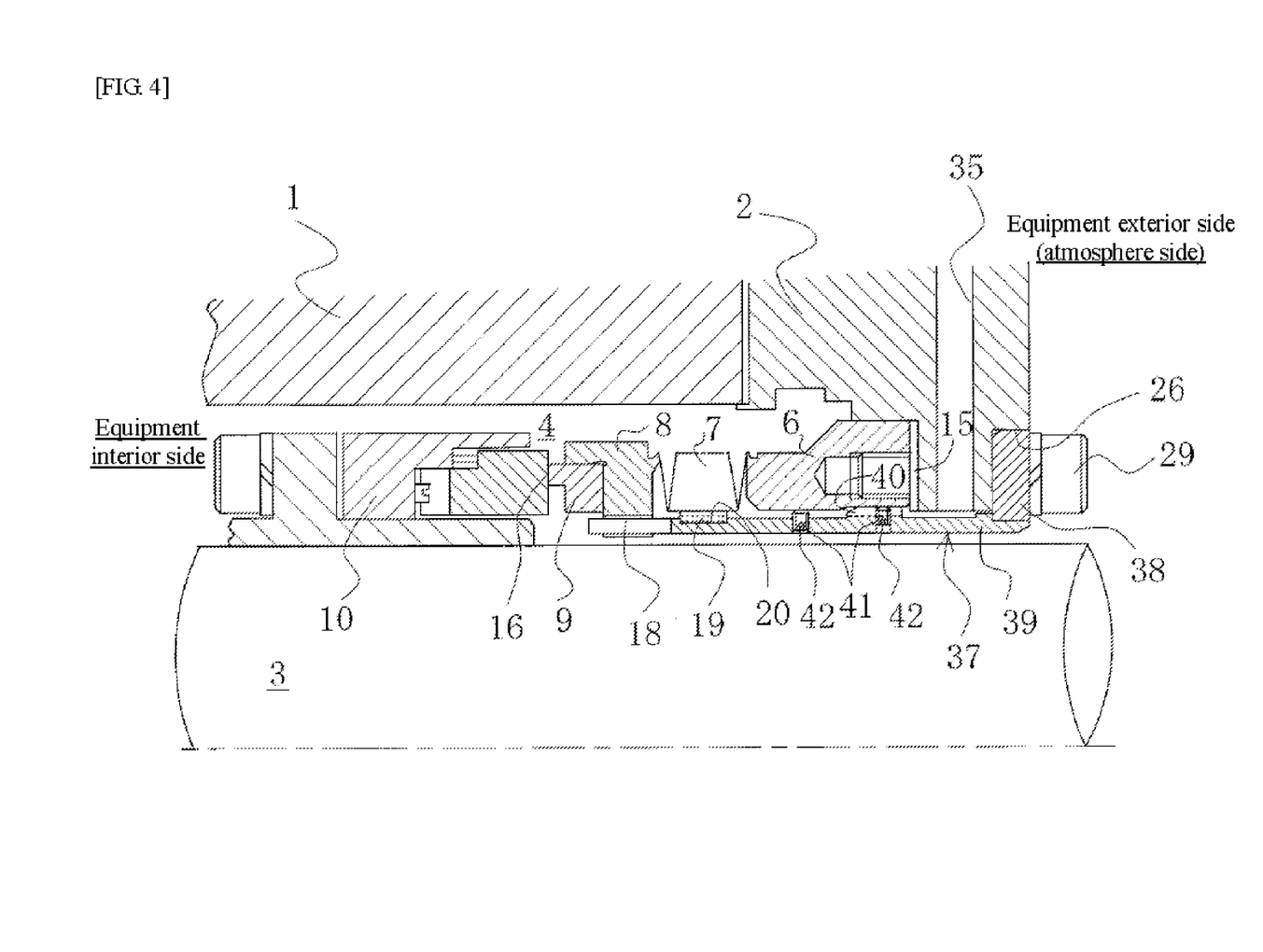
FIG. 4 Longitudinal section view showing an example of a mechanical seal conforming to Embodiment 2 of the present invention.

The mechanical seal conforming to Embodiment 2 of the present invention is explained by referring to FIG. 4.

The mechanical seal conforming to Embodiment 2 is different from Embodiment 1 in terms of baffle sleeve shape/structure, but the remainder is the same as in FIG. 1, and therefore in FIG. 4, the same symbols as those in FIG. 1 represent the corresponding members. The following primarily explains the differences from Embodiment 1.

In FIG. 4, a baffle sleeve 37 comprises a flange part 38 and cylinder part 39, has a roughly L-shaped cross-section, and the flange part 38 and cylinder part 39 are separate, where the basic structure is the same as that of the baffle sleeve 17 in Embodiment 1.

The baffle sleeve 37 has a ring-shaped convex part 40 in close proximity to the inner periphery surface of the collar 6. This ring-shaped convex part 40 projects in the diametral direction from the outer periphery surface of the baffle sleeve 37, and in the axial direction, it is provided at a position facing the inner periphery surface on the seal cover 2 side of the collar 6.

Due to the ring-shaped convex part 40 provided on the baffle sleeve 37, the inner periphery surface of the collar 6 comes in close proximity to the outer periphery surface of the ring-shaped convex part 40 when the baffle sleeve 37 is fixed on the seal cover 2, which is very effective in damping the vibration of the baffle sleeve 37.

Axial through-cutouts are provided at multiple positions on the ring-shaped convex part 40 in the circumferential direction so that quenching liquid supplied from the quenching liquid supply hole 35 can be guided toward the seal surface 16 side along the baffle sleeve 37.

Furthermore, tapped holes 41 are provided in the cylinder part 39 of the baffle sleeve 37 at positions facing the inner periphery surface of the collar 6. In FIG. 4, two tapped holes 41 are provided in the baffle sleeve 37 in the axial direction, but it is sufficient that at least one hole is provided in the axial direction, but preferably multiple holes are provided at an equal pitch in the circumferential direction. Setscrews 42 are screwed into these tapped holes 41 from the inner side of the baffle sleeve 37 in the diametral direction to contact with the inner periphery surface of the collar 6. By screwing in the setscrews 42, the baffle sleeve 37 is fixed with the collar 6 to prevent rattling of members during transport after preassembling the collar 6, baffle sleeve 37, etc., and also during operation.

Embodiment 3

Figure 5:
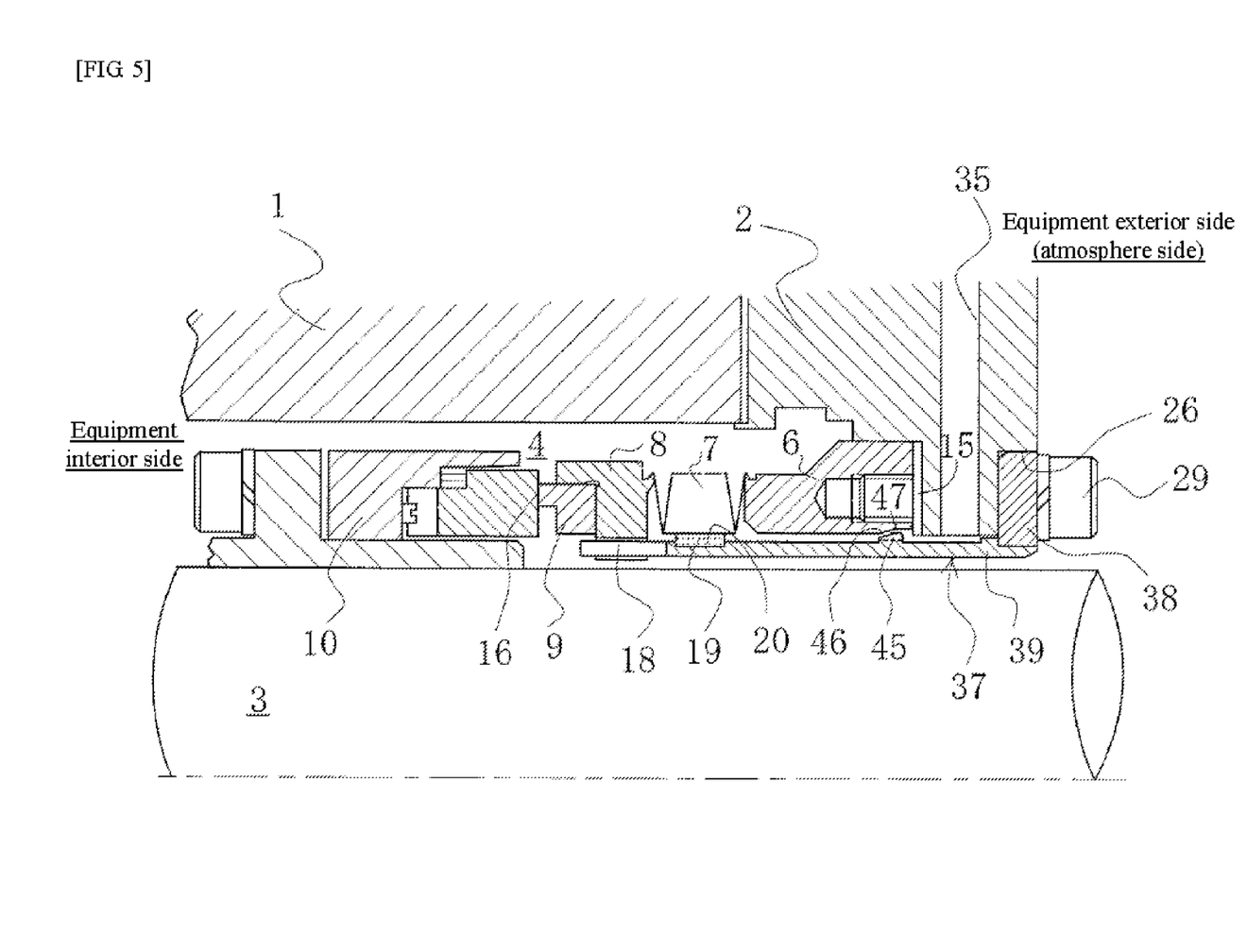
FIG. 5 Longitudinal section view showing an example of a mechanical seal conforming to Embodiment 3 of the present invention.
Figure 6:
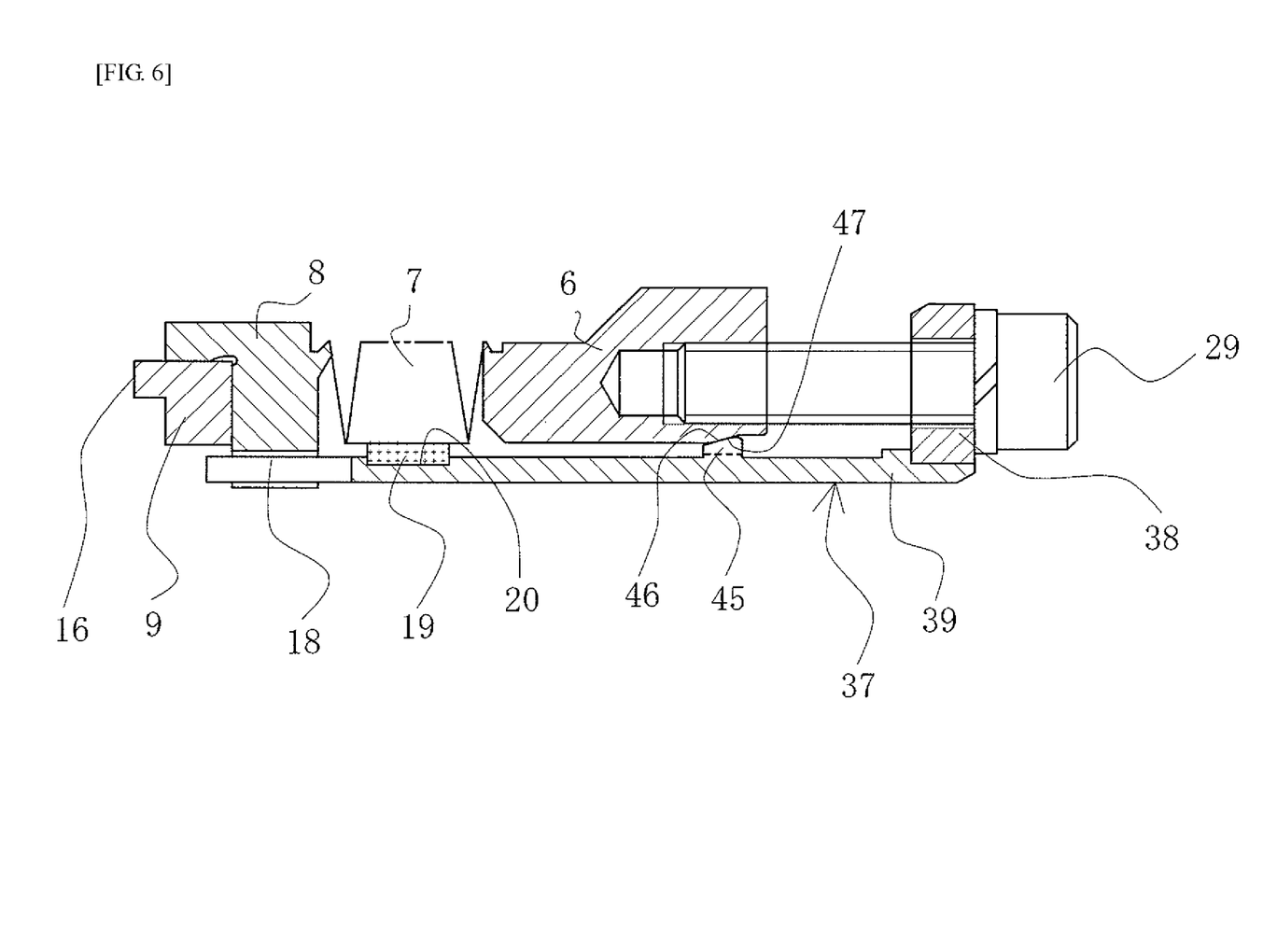
FIG. 6 Longitudinal section view showing the condition during transport of the collar, bellows, retainer, seal ring, and baffle sleeve of the mechanical seal conforming to Embodiment 3 of the present invention.

The mechanical seal conforming to Embodiment 3 of the present invention is explained by referring to FIGS. 5 and 6.

The mechanical seal conforming to Embodiment 3 is different from Embodiment 1 in terms of baffle sleeve and collar shapes, but the remainder is the same as in FIG. 1, and therefore in FIGS. 5 and 6, the same symbols as those in FIG. 1 represent the corresponding members. The following primarily explains the differences from Embodiment 1.

In FIG. 5, the baffle sleeve 37 comprises the flange part 38 and cylinder part 39, has a roughly L-shaped cross-section, and the flange part 38 and cylinder part 39 are separate, where the basic structure is the same as that of the baffle sleeve 17 in Embodiment 1.

The baffle sleeve 37 has a ring-shaped convex part 45 in close proximity to the inner periphery surface of the collar 6. This ring-shaped convex part 45 projects in the diametral direction from the outer periphery surface of the baffle sleeve 37, and in the axial direction, it is provided at a position facing the inner periphery surface on the seal cover 2 side of the collar 6.

Also, the outer periphery surface of the ring-shaped convex part 45 is formed in a tapered shape to provide a tapered part 46, and another tapered part 47 is provided on the inner periphery surface of the collar 6 in a manner facing the aforementioned tapered part 46. These tapered parts 46, 47 are provided in such a way that they can contact each other by moving relative to each other in the axial direction, but do not interfere with each other during assembly. In FIG. 5, the tapered parts 46, 47 form tapered shapes that decrease in diameter toward the equipment interior side of the seal cover 2, and when the bolt 29 is tightened, the collar 6 moves right while the baffle sleeve 37 moves left and because of this relative movement, the tapered parts 46, 47 contact each other and the collar 6 and baffle sleeve 37 are fixed together as a result.

In addition, axial through-cutouts are provided at multiple positions on the ring-shaped convex part 45 in the circumferential direction so that quenching liquid supplied from the quenching liquid supply hole 35 can be guided toward the seal surface 16 side along the baffle sleeve 37.

Although FIG. 5 shows only the ring-shaped convex part 45, the present invention is not limited to the foregoing and the ring-shaped convex part 40 in Embodiment 2 can be used together.

FIG. 6 is a longitudinal section view showing the condition during transport of the collar 6, bellows 7, retainer 8, seal ring 9, and baffle sleeve 37, where the bolt 29 is tightened to cause the tapered parts 46, 47 to contact each other and fix the collar 6 and baffle sleeve 37 together. Because the tapered part 46 is provided on the outer periphery surface of the ring-shaped convex part 45 on the baffle sleeve 37 and the tapered part 47 is provided on the inner periphery surface of the collar 6 in a manner facing the tapered part 46, and because these tapered parts 46, 47 are provided in such a way that they can contact each other by moving relative to each other in the axial direction, but do not interfere with each other during assembly, the bolt 29 for fixing the flange part 38 on the equipment exterior side of the seal cover 2 can be used to fix the tapered part 46 of the ring-shaped convex part 45 of the baffle sleeve 37 with the tapered part 47 of the collar 6 in a manner contacting each other to prevent rattling of members without having to prepare any special fixing member during transport after preassembling the collar 6, baffle sleeve 37, etc.

Figure 7:
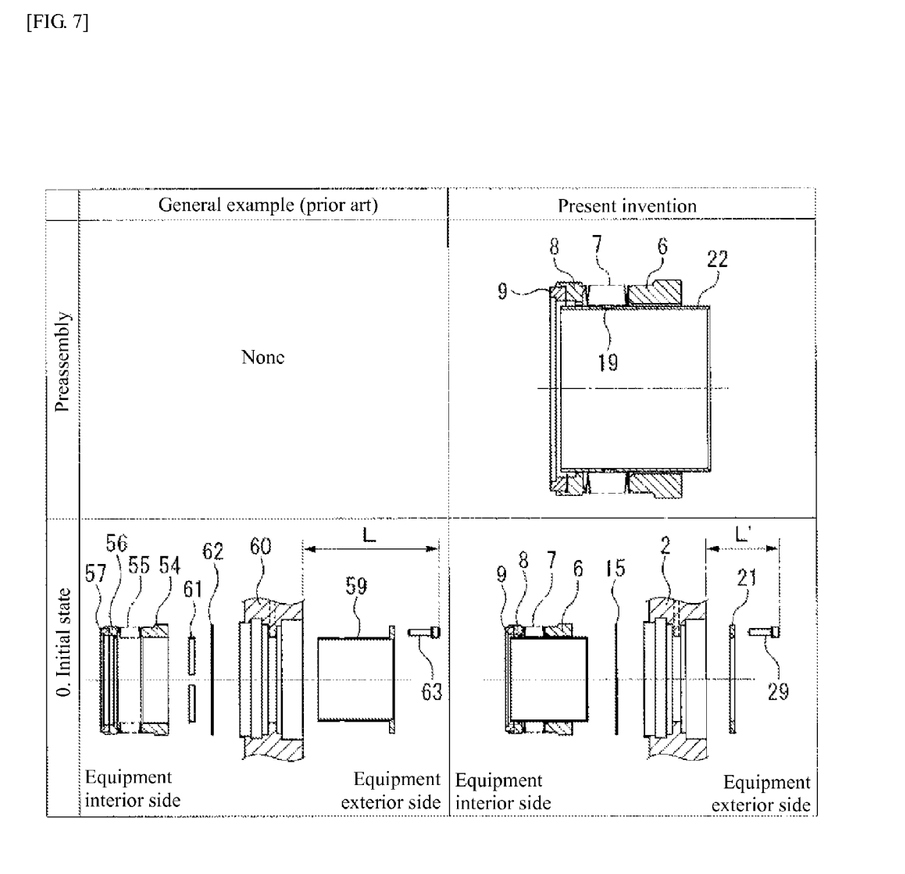
FIG. 7 Partial drawing explaining, by comparison, the assembly steps of a mechanical seal conforming to the present invention and that of a mechanical seal according to the prior art.
Figure 8:
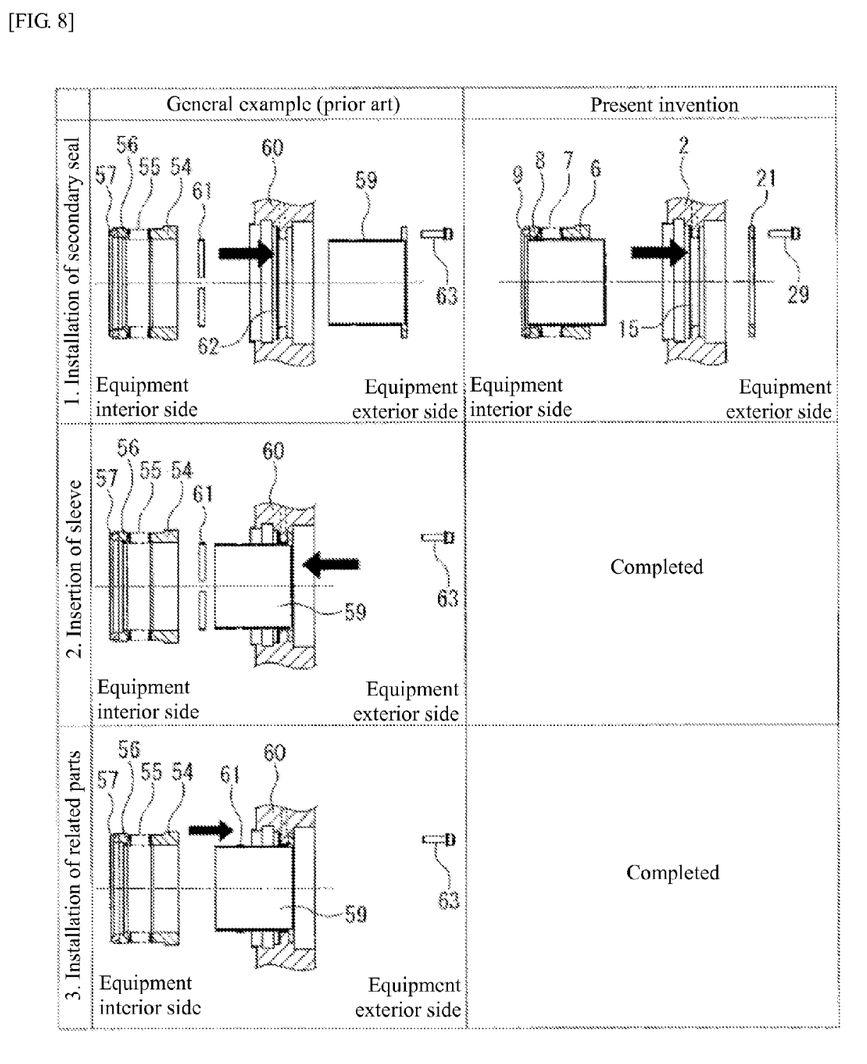
FIG. 8 Partial drawing explaining, by comparison, the assembly steps of a mechanical seal conforming to the present invention and that of a mechanical seal according to the prior art.
Figure 9:
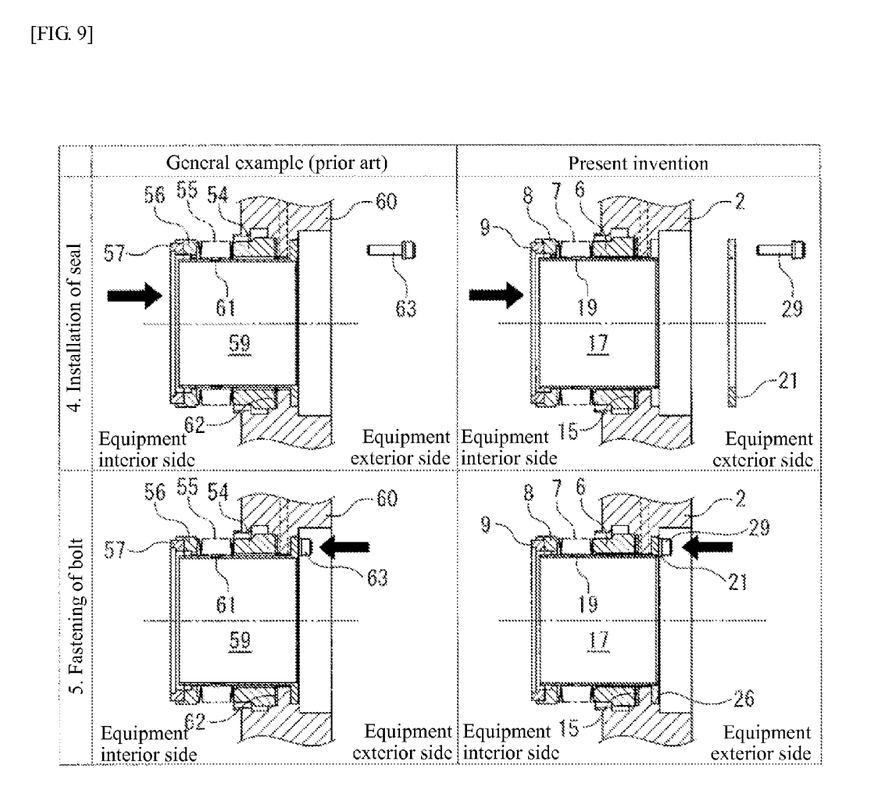
FIG. 9 Partial drawing explaining, by comparison, the assembly steps of a mechanical seal conforming to the present invention and that of a mechanical seal according to the prior art.

Next, the assembly steps of the mechanical seal conforming to Embodiment 1 of the present invention, such as the mechanical seal shown in FIG. 1, are explained by comparing them against those of the mechanical seal according to the prior art by referring to FIGS. 7 to 9.

In the case of Embodiment 3, supplemental explanation is provided regarding the differences from Embodiment 1.

(1) Preassembly

With the mechanical seal proposed by the present invention, the collar 6, bellows 7, retainer 8, seal ring 9, cylinder part 22 of the baffle sleeve 17, and damper 19 are preassembled in a reliable and controlled manner at a factory or service center (hereinafter referred to as "factory, etc.") (the preassembled members are hereinafter referred to as "preassembled members"), thereby requiring fewer member assembly steps during onsite engineering works.

With the mechanical seal according to the prior art, on the other hand, the collar 54, bellows 55, retainer 56, seal ring 57, and other seal members on the stationary side can be installed with the one-piece baffle sleeve 59 with roughly an L-shaped cross-section only from the opposite side of the seal cover 60, and therefore the seal members on the stationary side cannot be preassembled with the baffle sleeve 59.

With the mechanical seal conforming to Embodiment 3 of the present invention, the collar 6, bellows 7, retainer 8, seal ring 9, and baffle sleeve 37 are preassembled in a fixed state via the tapered parts 46, 47, when the bolt 29 is tightened, as shown in FIG. 6.

(2) Initial State Onsite, Etc.

With the mechanical seal proposed by the present invention, the preassembled members and gasket 15 are placed on the equipment interior side of the seal cover 2, while the flange part 21 of the baffle sleeve 17 and bolt 29 are placed on the equipment exterior side.

With the mechanical seal according to the prior art, on the other hand, the seal members on the stationary side, damper 61, and gasket 62 are placed on the equipment interior side of the seal cover 60, while the one-piece baffle sleeve 59 and bolt 63 are placed on the equipment exterior side.

As shown in the explanation drawing, the installation space L' for the mechanical seal conforming to the present invention is significantly smaller than the installation space L for the mechanical seal according to the prior art. This is to say that the mechanical seal conforming to the present invention can be assembled in a smaller space.

With the mechanical seal conforming to Embodiment 3 of the present invention, the bolt 29 shown in FIG. 6 is loosened to separate the cylinder part 39 and flange part 38 of the baffle sleeve 37, with the preassembled members and gasket 15 placed on the equipment interior side of the seal cover 2, and flange part 38 of the baffle sleeve 37 and bolt 29 placed on the equipment exterior side.

(3) Installation of Secondary Seal

With both the mechanical seal conforming to the present invention and mechanical seal according to the prior art, a secondary seal member, or specifically the gasket 15 or gasket 62, is installed on the seal cover side.

(4) Insertion of Sleeve

With the mechanical seal according to the prior art, the one-piece baffle sleeve 59 placed on the equipment exterior side of the seal cover 60 is inserted into the seal cover 60. With the mechanical seal conforming to the present invention, on the other hand, the cylinder part 22 of the baffle sleeve 17 is preassembled and therefore insertion of the baffle sleeve 17 into the seal cover 2 is no longer required.

(5) Installation of Related Parts

With the mechanical seal according to the prior art, the damper 61, which is a related part, is wrapped around the baffle sleeve 59 from the equipment interior side of the seal cover 60, and then the seal members on the stationary side are inserted into the outer diameter side of the baffle sleeve 59, but this process is a little difficult. With the mechanical seal conforming to the present invention, on the other hand, the corresponding damper 19 as an associated part is preassembled and therefore installation of the damper 19 into the cylinder part 22 of the baffle sleeve 17 is no longer required, which eliminates installation errors, non-installation, etc., and the designed performance can be ensured.

(6) Installation of Seal

With the mechanical seal conforming to the present invention, the preassembled members including the cylinder part 22 of the baffle sleeve 17 and damper 19 are directly installed on the seal cover 2 from the equipment interior side.

With the mechanical seal according to the prior art, on the other hand, the seal members on the stationary side are inserted into the outer diameter side of the baffle sleeve 59 while the damper 61 remains wrapped around the baffle sleeve 59, which makes it difficult to ensure accurate installation.

(7) Fastening of Bolt

With the mechanical seal conforming to the present invention, the flange part 21 of the baffle sleeve 17 is positioned with the tapered surface 26 of the seal cover 2 to fasten the bolt 29. As the bolt 29 is tightened, the flange part 21 shrinks along its diameter and its inner periphery surface clamps the outer periphery surface of the cylinder part of the baffle sleeve 17, effectively creating a condition of interference fit. As a result, the flange part 21 and cylinder part are integrally fixed on the seal cover 2.

With the mechanical seal according to the prior art, on the other hand, the bolt 63 is fastened to the seal cover 60 via the flange part of the baffle sleeve 59.

The effects of the mechanical seal conforming to each embodiment of the present invention are as follows:

(1) The baffle sleeve 17 or 37 conforming to the present invention splits into the flange part 21 or 38 and cylinder part 22 or 39, and accordingly the collar 6, bellows 7, retainer 8, seal ring 9, baffle sleeve 17 or 37 cylinder part 22 or 39, and damper 19 can be preassembled in a reliable and controlled manner at a factory, etc., thereby requiring fewer member assembly steps during onsite engineering works. This not only improves the ease of assembly, but also reduces human errors during onsite engineering works. In addition, while traditionally carving a one-piece baffle sleeve with roughly an L-shaped cross-section from a round bar requires a material of "outer diameter of the flange part×length of the cylinder part" in size, and machining the round bar to change its cross-section to roughly an L-shape is a very wasteful exercise because the majority of the round bar must be shaved off, the baffle sleeve 17 or 37 under the present invention is formed of separate materials constituting its flange part 21 or 38 and cylinder part 22 or 39, respectively, and therefore the waste associated with the prior art can be eliminated.

(2) With the mechanical seal conforming to the present invention, the installation space on the equipment exterior side of the seal cover 2 can be made significantly smaller than under the prior art, which allows for assembly in a smaller space.

(3) With the baffle sleeve 17 or 37 conforming to the present invention, the slit 27 is formed in one location of the flange part 21 or 38 in the circumferential direction, where the inner periphery surface of the flange part 21 or 38 engages with the outer periphery surface of the cylinder part 22 or 39, while the outer periphery surface of the flange part 21 or 38 engages with the tapered surface for flange engagement 26 provided on the equipment exterior side of the seal cover 2, so when the outer periphery surface of the flange part 21 or 38 is fit along the tapered surface 26, the inner periphery surface of the flange part 21 or 38 clamps the outer periphery surface of the cylinder part 22 or 39 and, accordingly, fitting the flange part 21 or 38 into the specified position of the seal cover 2 exerts clamping force in the diametral direction to keep the flange part 21 or 38 and cylinder part 22 or 39 connected just like a one-piece baffle sleeve. As a result, a baffle sleeve sufficiently capable of withstanding vibration and other external disturbances can be obtained.

(4) The flange part 21 or 38 of the baffle sleeve 17 or 37 conforming to the present invention has multiple bolt holes 28 in the circumferential direction and is fixed on the equipment exterior side of the seal cover 2 via the bolt 29, which means that the flange part 21 or 38 can be fit in the specified position by means of the bolt 29, while clamping force is exerted in the diametral direction to keep the flange part 21 or 38 and cylinder part 22 or 39 connected just like a one-piece baffle sleeve.

(5) The flange part 21 or 38 of the baffle sleeve 17 or 37 conforming to the present invention has a part having a small cross-section area formed at a position on the opposite side of the slit 27 in the circumferential direction, which facilitates elastic deformation as the flange part 21 or 38 shrinks along its diameter.

(6) With the baffle sleeve 37 conforming to Embodiment 2, the ring-shaped convex part 40 is provided and accordingly vibration of the baffle sleeve 37 can be damped quite effectively when the baffle sleeve 37 is fixed on the seal cover 2, because the inner periphery surface of the collar 6 is in close proximity to the outer periphery surface of the ring-shaped convex part 40.

(7) With the baffle sleeve 37 conforming to Embodiment 2, the tapped holes 41 and setscrews 42 are provided at positions facing the inner periphery surface of the collar 6, and accordingly by screwing in the setscrews 42, the baffle sleeve 37 is fixed with the collar 6 to prevent rattling of members during transport after preassembling the collar 6, baffle sleeve 37, etc., and also during operation.

(8) With Embodiment 3, the ring-shaped convex part with a tapered part on its outer periphery surface is provided on the outer periphery surface of the cylinder part of the baffle sleeve, in close proximity to the inner periphery surface of the cylindrical collar connected to one end of the bellows, while another tapered part is provided on the inner periphery surface of the collar in a manner facing the aforementioned tapered part, and these tapered parts are provided in such a way that they can contact each other by moving relative to each other in the axial direction, but do not interfere with each other during assembly, and accordingly the bolt 29 for fixing the flange part 38 on the equipment exterior side of the seal cover 2 can be used to fix the tapered part 46 of the ring-shaped convex part 45 of the baffle sleeve 37 with the tapered part 47 of the collar 6 in a manner contacting each other to prevent rattling of members without having to prepare any special fixing member during transport after preassembling the collar 6, baffle sleeve 37, etc.

REFERENCE SIGNS

1 Housing
2 Seal cover
3 Rotational shaft
4 Shaft seal part
6 Collar
7 Bellows
8 Retainer
9 Seal ring
10 Mating ring
11 Retainer
12 Seal ring
13 Alignment case
14 Concave part
15 Gasket
16 Seal surface
17 Baffle sleeve
18 Clutch structure
19 Damper
20 Ring-shaped groove
21 Flange part
22 Cylinder part
23 Inner periphery surface
24 Outer periphery surface at base end of cylinder part
25 Outer periphery surface of flange part
26 Tapered surface for flange engagement
27 Slit
28 Bolt hole
29 Bolt
30 Tapped hole
31 Slit
32 Through hole
35 Quenching liquid supply hole
37 Baffle sleeve
38 Flange part
39 Cylinder part
40 Ring-shaped convex part
41 Tapped hole
42 Setscrew
45 Ring-shaped convex part
46 Tapered part on outer periphery surface of ring-shaped convex part
47 Tapered part on inner periphery surface of collar

The invention claimed is:

1. A mechanical seal installed on a shaft seal part formed between a housing and a rotational shaft to seal a space between the housing and rotational shaft, the mechanical seal characterized in that: the mechanical seal has a seal ring and a mating ring that faces and slides against the seal ring and either the seal ring or mating ring is supported via a bellows on an equipment interior side of a seal cover installed on the housing, while the other rotates together with the rotational shaft; and a baffle sleeve with a roughly L-shaped cross-section is fixed on an equipment exterior side of the seal cover to guide quenching liquid to sliding surfaces of the seal ring and mating ring, where the baffle sleeve structurally splits into a flange part and a cylinder part which are not clamped to each other prior to the fixing of the baffle sleeve on the equipment exterior side of the seal cover,
  wherein the flange part has an elongate slit with a width formed only in one location and extending in a circumferential direction, said slit extending fully from an inner periphery surface to an outer periphery surface of the flange part at the one location, said flange part including a cutout having a Ω-shape at a location opposite to and facing the slit with reference to a center of the flange part, said flange part being capable of reducing its outer diameter by elastic deformation when the flange part is pressed radially from an outer side of the flange part in a direction perpendicular to the slit so as to reduce the width of the slit, and wherein said flange part has multiple separation tapped holes arranged in a circumferential direction, to facilitate separation of the flange part from the seal cover,
  wherein the outer periphery surface of the flange part is compression-fitted to an engaging surface for flange engagement provided on the equipment exterior side of the seal cover thereby engaging the inner periphery surface of the flange part with an outer periphery surface of the cylinder part and clamping the flange part and the cylindrical part which are integrated with the seal cover.

2. A mechanical seal according to claim 1, characterized in that: the flange part has multiple bolt holes in a circumferential direction and is fixed on the equipment exterior side of the seal cover via a bolt.

3. A mechanical seal according to claim 1, characterized in that: a ring-shaped convex part is provided on the outer periphery surface of the cylinder part of the baffle sleeve, in close proximity to an inner periphery surface of a cylindrical collar connected to one end of the bellows.

4. A mechanical seal according to claim 1, characterized in that: a fixing means for fixing the baffle sleeve and collar is provided on the cylinder part of the baffle sleeve.

5. A mechanical seal according to claim 1, characterized in that: a ring-shaped convex part with a tapered part on its outer periphery surface is provided on the outer periphery surface of the cylinder part of the baffle sleeve, in close proximity to an inner periphery surface of a cylindrical collar connected to one end of the bellows, while another tapered part is provided on the inner periphery surface of the collar in a manner facing the aforementioned tapered part; and the tapered parts are provided in such a way that they can contact each other by moving relative to each other in an axial direction, but do not interfere with each other during assembly.

6. A mechanical seal according to claim 2, characterized in that: a ring-shaped convex part is provided on the outer periphery surface of the cylinder part of the baffle sleeve, in close proximity to an inner periphery surface of a cylindrical collar connected to one end of the bellows.

7. A mechanical seal according to claim 2, characterized in that: a fixing means for fixing the baffle sleeve and collar is provided on the cylinder part of the baffle sleeve.

8. A mechanical seal according to claim 2, characterized in that: a ring-shaped convex part with a tapered part on its outer periphery surface is provided on the outer periphery surface of the cylinder part of the baffle sleeve, in close proximity to an inner periphery surface of a cylindrical collar connected to one end of the bellows, while another tapered part is provided on the inner periphery surface of the collar in a manner facing the aforementioned tapered part; and the tapered parts are provided in such a way that they can contact each other by moving relative to each other in an axial direction, but do not interfere with each other during assembly.

9. A mechanical seal according to claim 3, characterized in that: a fixing means for fixing the baffle sleeve and collar is provided on the cylinder part of the baffle sleeve.

10. A mechanical seal according to claim 1, wherein the flange part is C-shaped in an axial direction of the cylinder part.

11. A mechanical seal according to claim 1, characterized in that a part of the outer periphery surface of the flange part is constituted by a tapered surface.

12. A mechanical seal according to claim 1, characterized in that at least a part of each of the outer periphery surface of the flange part and the engaging surface of the seal cover is constituted by a tapered surface.

13. The mechanical seal according to claim 1, wherein the tapped holes are arranged at locations opposite to one another with reference to the center of the flange part.

* * * * *